United States Patent
Chang et al.

(10) Patent No.: US 10,379,568 B2
(45) Date of Patent: Aug. 13, 2019

(54) ENERGY SUPPLY CIRCUIT WITHOUT POWER CONVERTER AND ELECTRONIC DEVICE USING SAME

(71) Applicants: Seoul National University R&DB Foundation, Seoul (KR); Center for Integrated Smart Sensors Foundation, Daejeon (KR)

(72) Inventors: Nae-Hyuck Chang, Seoul (KR);
Jin-Young Yang, Seoul (KR);
Chai-Yeol Rim, Seoul (KR);
Chong-Min Kyung, Daejeon (KR)

(73) Assignees: Seoul National University R&DB Foundation, Gwanak-ro, Gwanak-gu, Seoul (KR); Center for Integrated Smart Sensors Foundation, Daehak-ro, Yuseong-gu, Daejon (KR)

( * ) Notice: Subject to any disclaimer, the term of this patent is extended or adjusted under 35 U.S.C. 154(b) by 594 days.

(21) Appl. No.: 15/030,777

(22) PCT Filed: Oct. 21, 2014

(86) PCT No.: PCT/KR2014/009868
§ 371 (c)(1),
(2) Date: Apr. 20, 2016

(87) PCT Pub. No.: WO2015/060607
PCT Pub. Date: Apr. 30, 2015

(65) Prior Publication Data
US 2016/0246320 A1 Aug. 25, 2016

(30) Foreign Application Priority Data
Oct. 21, 2013 (KR) .................. 10-2013-0125343

(51) Int. Cl.
*H02J 7/00* (2006.01)
*G05F 5/00* (2006.01)
(Continued)

(52) U.S. Cl.
CPC .............. *G05F 5/00* (2013.01); *G01G 23/36* (2013.01); *G05F 1/67* (2013.01); *G06F 1/30* (2013.01)

(58) Field of Classification Search
CPC .. G05F 5/00; G05F 1/67; G01G 23/36; G06F 1/30
(Continued)

(56) References Cited

U.S. PATENT DOCUMENTS 9,948,233 B2 * 4/2018 Adest ................ H01L 31/02021
2007/0182535 A1 8/2007 Seguchi
(Continued)

FOREIGN PATENT DOCUMENTS

CN 102420523 A 4/2012
KR 10-2010-031025 A 3/2010
(Continued)

OTHER PUBLICATIONS

Wang W.S. et al., Design Considerations of Sub-mW Indoor Light Energy Harvesting for Wireless Sensor Systems, ACM Journal on Emerging Technologies in Computing Systems, vol. 6, No. 2, Article 6, Jun. 2010.
(Continued)

*Primary Examiner* — Brandon S Cole
(74) *Attorney, Agent, or Firm* — Kenneth E. Horton; Kirton McConkie (57) ABSTRACT

The present invention relates to an energy supply circuit for instantly supplying power without a power converter and an electronic device which operates only when energy is supplied from an energy source using the same. An energy
(Continued)

supply circuit without a power converter according to the present invention comprises: an energy extraction unit 10 for generating power from an energy source; and output unit 20 for supplying power to an external electronic circuit; a switch unit 30 interposed between the energy extraction unit and the output unit 20 to connect an output end of the energy extraction unit 10 to the output unit 20 when switched on; and a maximum power point tracking control unit 40 for generating an open/closed signal for opening or closing the switch unit 30 according to the voltage and current of the energy extraction unit 10. The present invention has a technical feature wherein a turn-on point of the open/closed signal comes at a time when the output end voltage of the energy extraction unit 10 is Vh, and a turn-off point comes at a time when the output end voltage of the energy extraction unit 10 is Vl. Accordingly, the present invention has a simple configuration, low manufacturing costs, has no energy loss due to the power conversion, and has no reduction in life due to charging and discharging of an energy storage device.

10 Claims, 7 Drawing Sheets

(51) Int. Cl.
| | |
|---|---|
| *H02S 40/00* | (2014.01) |
| *H01L 31/04* | (2014.01) |
| *H02M 7/537* | (2006.01) |
| *H02J 9/00* | (2006.01) |
| *G06F 1/26* | (2006.01) |
| *H01L 31/00* | (2006.01) |
| *G05F 1/67* | (2006.01) |
| *G01G 23/36* | (2006.01) |
| *G06F 1/30* | (2006.01) |

(58) Field of Classification Search
USPC .................................................. 307/139–147
See application file for complete search history.

(56) References Cited

U.S. PATENT DOCUMENTS

| | | | |
|---|---|---|---|
| 2012/0187897 A1* | 7/2012 | Lenk .................... | H01M 10/44 320/101 |
| 2013/0212410 A1* | 8/2013 | Li .......................... | G06F 1/263 713/300 |
| 2014/0252862 A1* | 9/2014 | Cheng ................... | H02J 3/385 307/82 |
| 2014/0265595 A1* | 9/2014 | Cheng ................... | H02J 9/00 307/66 |
| 2015/0236182 A1* | 8/2015 | Moslehi ............. | H01L 31/0475 136/249 |
| 2016/0087579 A1* | 3/2016 | Moslehi ............. | H01L 31/0516 136/251 |
| 2016/0246320 A1* | 8/2016 | Chang .................... | G05F 1/67 |

FOREIGN PATENT DOCUMENTS

| | | |
|---|---|---|
| KR | 10-2011-0104525 | 9/2011 |
| KR | 10-2013-0094028 A | 8/2013 |
| WO | 2010135379 A2 | 11/2010 |

OTHER PUBLICATIONS

Benjamin Ransford et al., Mementos: System Support for Long-Running Computation of RFID-Scale Devices, ASPLOS' 11, Mar. 5-11, 2011.

Navid Amini et al., The Design of a Wireless Portable Device for Personalized Ultraviolet Monitoring, Iosensing II, Proc. of SPIE vol. 7397.

\* cited by examiner

Dynamic Power Management Results.

| | Common DPM statistics | | | | Proposed System | | | Volatile Microprocessor Baseline | | |
|---|---|---|---|---|---|---|---|---|---|---|
| Time | $V_{mpp}$ (V) | $T_{dpm}$ (µs) | $D_{dpm}$ | $E_{mpp}$ (J) | Work | $E_{task}$ (J) | $\eta_{sys}$ (%) | Work | $E_{task}$ (J) | $\eta_{sys}$ (%) |
| 7:00 | 2.50 | N/A | N/A | 4.83 | No | 0 | 0 | No | 0 | 0 |
| 8:00 | 2.73 | 218 | 31.6% | 50.14 | Yes | 36.38 | 72.6 | No | 0 | 0 |
| 9:00 | 2.72 | 224 | 30.0% | 47.81 | Yes | 34.30 | 71.7 | No | 0 | 0 |
| 10:00 | 2.76 | 191 | 46.9% | 71.95 | Yes | 57.07 | 79.3 | No | 0 | 0 |
| 11:00 | 2.78 | 195 | 56.5% | 85.69 | Yes | 71.25 | 83.1 | No | 0 | 0 |
| 12:00 | 2.80 | 301 | 79.7% | 118.14 | Yes | 108.37 | 91.7 | No | 0 | 0 |
| 13:00 | 2.82 | 1100 | 95.1% | 139.27 | Yes | 135.39 | 97.2 | Yes | 65.74 | 47.2 |
| 14:00 | 2.82 | 1360 | 99.6% | 145.27 | Yes | 143.72 | 98.9 | Yes | 138.34 | 95.2 |
| 15:00 | 2.76 | 192 | 45.8% | 70.38 | Yes | 55.51 | 78.9 | No | 0 | 0 |
| 16:00 | 2.70 | 260 | 23.6% | 38.57 | Yes | 26.27 | 68.1 | No | 0 | 0 |
| 17:00 | 2.67 | 369 | 14.8% | 25.98 | Yes | 15.90 | 61.2 | No | 0 | 0 |
| 18:00 | 2.69 | 294 | 19.9% | 33.21 | Yes | 21.78 | 65.6 | No | 0 | 0 |
| 19:00 | 2.50 | N/A | N/A | 4.11 | No | 0 | 0 | No | 0 | 0 |
| Overall | | | | 835.34 | | 705.94 | 84.5 | | 204.08 | 24.4 |

<Powerless UV sensor>

FIG. 12

ENERGY SUPPLY CIRCUIT WITHOUT POWER CONVERTER AND ELECTRONIC DEVICE USING SAME

This application is a PCT National Stage Application under 35 § 371 of PCT Application No. PCT/KR2014/009868, which claims priority of Korean Application No. 10-2013-0125343, the entire disclosures of which is incorporated herein by reference.

TECHNICAL FIELD

The present invention relates to an energy circuit without a power converter and an electronic device using the same, and more particularly, to an energy supply circuit for tracking a maximum power point (MPP) without a power converter and an electronic device operating only when an energy is supplied from an energy source using the same.

BACKGROUND ART

Figure 1:
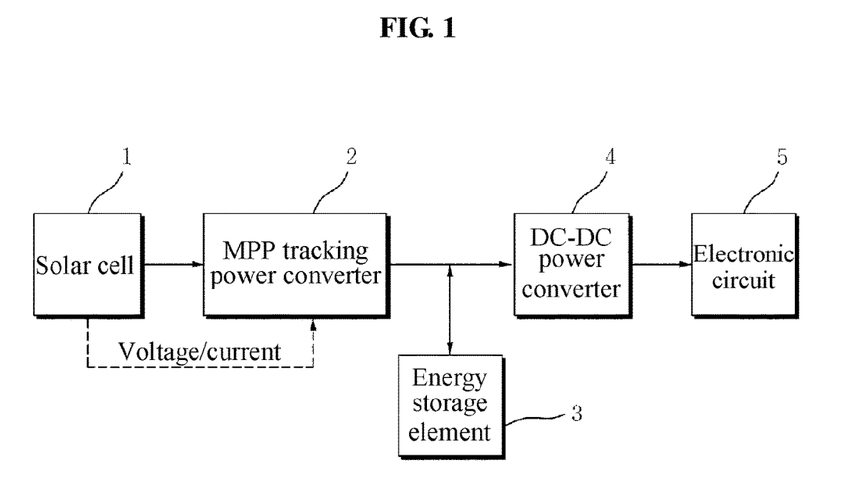
FIG. 1 illustrates a conventional sunlight energy supply apparatus.

Research into supplying energy using natural energy such as sunlight, solar heat, and wind power is being actively conducted due to issues of air pollution and fossil fuel exhaustion. Since an amount of sunlight as an energy source is limitless, a required amount of the sunlight is produced in a required place, and maintaining the sunlight is relatively easy. Thus, the sunlight may be used for various uses of an energy supply apparatus. In general, a sunlight energy supply apparatus may track a maximum power point (MPP) to extract a maximum power. An example of such conventional sunlight energy supply apparatus is illustrated in FIG. 1.

The conventional sunlight energy supply apparatus includes a solar cell 1, an MPP tracking power converter 2, an energy storage element 3, and a DC-DC power converter 4, and supplies a power to an external electronic circuit 5. When the solar cell 1 generates the power, the MPP tracking power converter 2 may control a voltage and a current to supply a maximum power. The power may be stored in the energy storage element 3, for example, a battery and a large capacitor, and supplied to the external electronic circuit 5 when necessary. Here, the voltage may be changed in and supplied by the DC-DC power converter 4 such that the voltage required in the external electronic circuit 5 may be supplied.

Concisely, the conventional sunlight supply apparatus includes the MPP tracking power converter 2 and the DC-DC power converter 4, and thus issues of increasing volume and manufacturing costs of the sunlight supply apparatus may arise.

Such issues may arise when a power converter is included, in relation to generation that may not be limited to sunlight generation.

Figure 2:
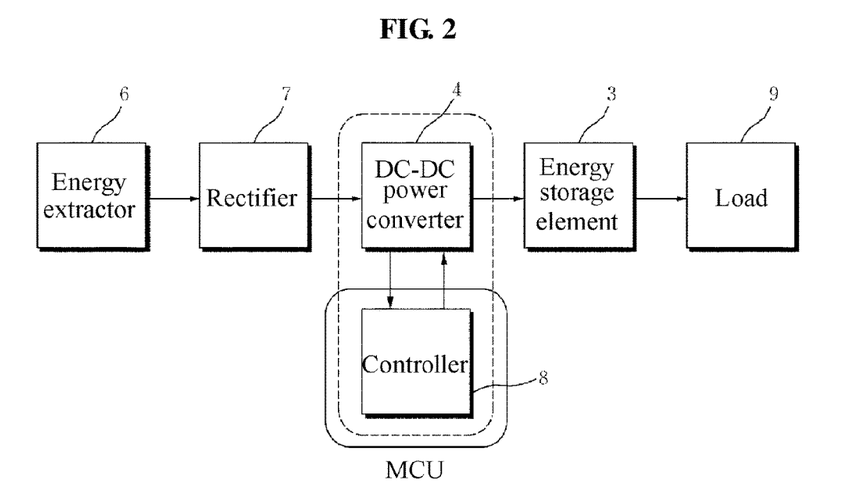
FIG. 2 illustrates a conventional energy supply apparatus of which an energy source is a general energy source.

FIG. 2 illustrates an example of a conventional energy supply apparatus of which an energy source is a general energy source. The conventional energy supply apparatus of FIG. 2 includes an energy extractor 6, a rectifier 7, the DC-DC power converter 4, a controller 8, and the energy storage element 3, and supplies a power to an external load 9. The energy extractor 6 may be the aforementioned solar cell, and may be provided in various forms, for example, a piezoelectric element and a thermoelectric element, according to a type of an energy source. The rectifier 7 is a selective configuration for converting an alternating current generated in the energy extractor 6 to a power of a direct current. The DC-DC power converter 4 stores energy in the energy storage element 3 by converting a power to a desired power of a direct current voltage according to a control of the controller 8. A power converter is also a required part of the energy supply apparatus of FIG. 2, and thus the issues of increasing volume and manufacturing costs of the energy supply apparatus may arise.

DISCLOSURE OF INVENTION

Technical Goals

An aspect of the present invention provides an energy supply circuit for tracking an MPP and an electronic device using the same by supplying a voltage required for an operation of an external electronic circuit with only switching operation without a power converter.

Technical Solutions

According to an aspect of the present invention, there is provided an energy supply circuit without a power converter including an energy extractor configured to generate a power from an energy source, an outputter configured to supply the power to an external electronic circuit, a switch disposed between the energy extractor and the outputter to connect an output end of the energy extractor to the outputter when the switch is on, and a maximum power point (MPP) tracking controller configured to generate an on and off signal to turn on and turn off the switch according to a voltage and a current of the energy extractor, wherein a turn-on time of the on and off signal is when an output end voltage of the energy extractor is Vh, and a turn-off time of the on and off signal is when the output end voltage of the energy extractor is Vl.

According to an aspect of the present invention, there is provided an electronic device including an energy supply circuit without a power converter and an external electronic circuit 200 to provide a power from the energy supply circuit without the power converter.

BEST MODE FOR CARRYING OUT THE INVENTION

The following detailed description of an energy supply circuit without a power converter and an electronic device using the same according to an embodiment is provided in order to explain the embodiments by referring to the figures.

Figure 3:
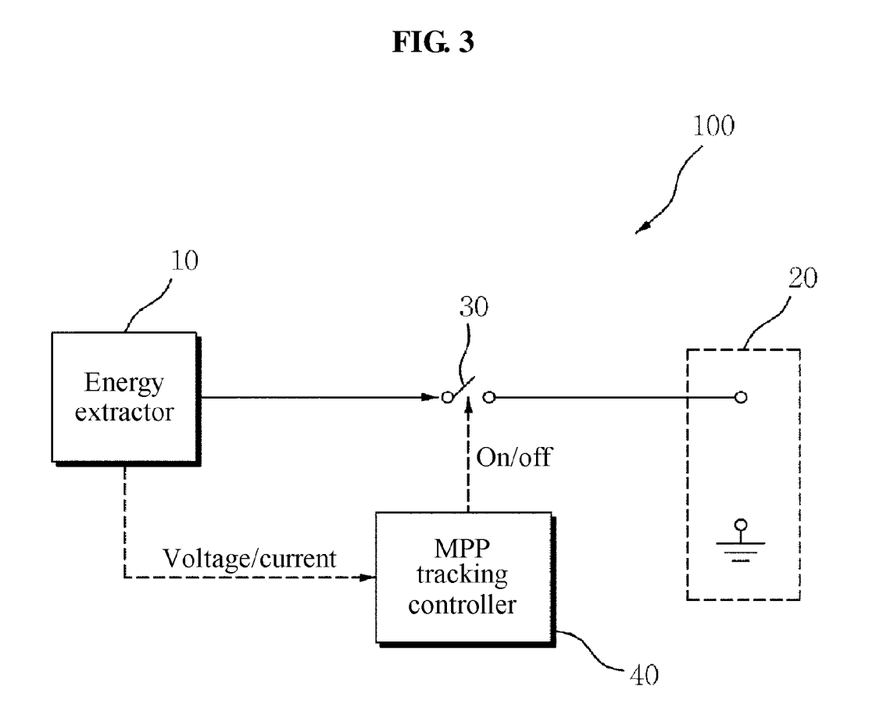
FIG. 3 illustrates an energy supply circuit without a power converter according to an embodiment of the present invention.

FIG. 3 illustrates an energy supply circuit without a power converter according to an embodiment of the present invention.

An energy supply circuit 100 without a power converter according to an embodiment includes an energy extractor 10, an outputter 20, a switch 30, and a maximum power point (MPP) tracking controller 40. The energy extractor 10 and the outputter 20 are connected to each end of the switch 30, and the MPP tracking controller 40 detects a voltage and a current of the energy extractor 10 to track an MPP by allowing the switch 30 to be in an on/off state when a power is generated in the energy extractor 10.

The energy extractor 10 is a constituent element that generates a power from an energy source to generate light, heat, vibration, pressure, and sound. For example, the energy extractor 10 may include at least one of a photoelectric element, for example, a solar cell, that converts light into electricity, a thermoelectric element, for example, a Peltier module, that converts a temperature difference into electricity, and a piezoelectric element that converts pressure and vibration into electricity using a material, for example, lead zirconate-titanate. In this example, a bulk capacitor may be connected to each end of the energy extractor 10 in parallel to control a cut-off frequency of the energy extractor 10. As the cut-off frequency of the energy extractor 10 is greater than a switching frequency, efficiency of an energy supply circuit without a power converter according to an embodiment may be enhanced.

As a constituent element that supplies the power to an external electronic circuit, the outputter 20 may be provided in a form of a terminal, a connector, and a pin to be appropriate for a power inputter of the external electronic circuit. Here, a decoupling capacitor may be connected to each end of the outputter 20 in parallel for integrity of the power.

The switch 30 disposed between the energy extractor 10 and the outputter 20 is a constituent element that connects an output end of the energy extractor 10 to the outputter 20. The switch 30 may be a field effect transistor, for example, a MOSFET and a JFET. For example, when the switch 30 is the MOSFET, a drain is connected to the output end of the energy extractor 10 and a source is connected to the outputter 20, and thus the energy extractor 10 and the outputter 20 are short-circuited or disconnected according to an on and off signal applied to a gate.

The MPP tracking controller 40 is a constituent element that generates the on and off signal to turn on and turn off the switch 30 according to the voltage and the current of the energy extractor 10, and a waveform of the on and off signal may be determined so the energy supply circuit without the power converter may track the MPP. A turn-on time of the on and off signal is when an output end voltage of the energy extractor 10 is Vh, and a turn-off time of the on and off signal is when the output end voltage of the energy extractor 10 is Vl (Vh>Vl, and Vh and Vl relate to a current at the MPP and a voltage required by the output end). Thus, in an example, the on and off signal may have a rectangular wave, and the MPP may be tracked based on a pulse width modulation (PWM) technique in which a pulse width of the on and off signal is changed, in response to an output of the energy extractor 10. In this example, a waveform of the outputter 20 may be maintained between a maximum voltage Vh and a minimum voltage Vl.

Thus, when Vh is sufficiently close to Vl, the energy supply circuit without the power converter may be operated with a constant-voltage regulated power supply for each time interval, and may be used as a power of an electronic circuit, for example, a microprocessor of which an operation voltage is predetermined Accordingly, the energy supply circuit without the power converter may supply required energy to the external electronic circuit without an energy storage or a power converter only when the energy supply circuit is capable of providing the required energy.

Detailed descriptions of an MPP tracking algorithm will be provided. The MPP tracking controller 40 may generate a sleep/wake up signal instructing the external electronic circuit to operate in a sleep mode corresponding to a standby state or low power consuming state or to operate in an active mode corresponding to a steady operating state according to an attribute of the external electronic circuit, and transmit the generated sleep/wake up signal to the external electronic circuit 200.

Figure 4:
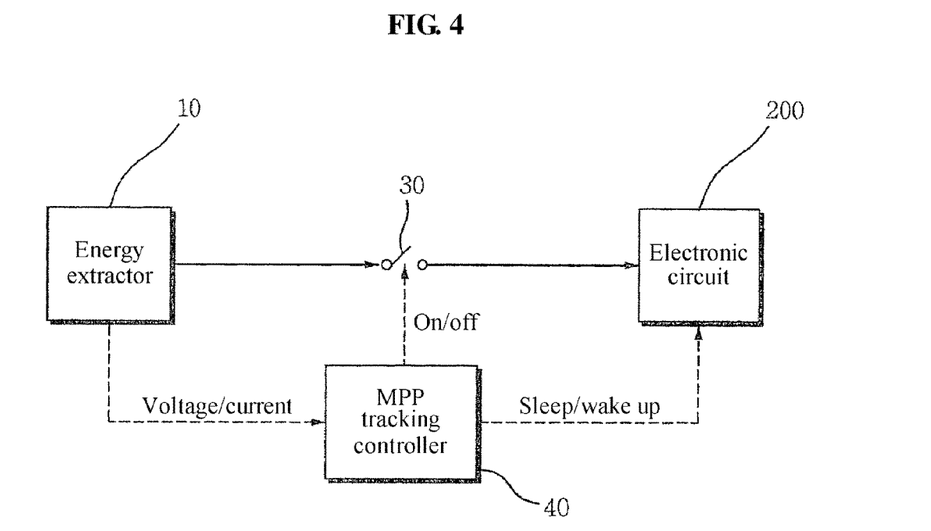
FIG. 4 illustrates an electronic device according to an embodiment of the present invention.

FIG. 4 illustrates an electronic device according to an embodiment of the present invention, the electronic device includes the energy supply circuit 100 without the power converter, and the external electronic circuit 200. A power is supplied to the external electronic circuit 200 through the outputter 20 of the energy supply circuit 100. The external electronic circuit 200 includes a microprocessor 60. The external electronic circuit 200 may further include a read-only memory (ROM) for storing a basic input output system (BIOS), a clock generator for synchronization, and a peripheral device. As will be described later, it is advisable that the microprocessor 60 of the external electronic circuit 200 be a nonvolatile microprocessor unit (NVMPU).

Detailed descriptions of the energy supply circuit without the power converter will be provided based on detailed examples of the energy extractor 10 and the external electronic circuit 200.

[First Embodiment]

Figure 5:
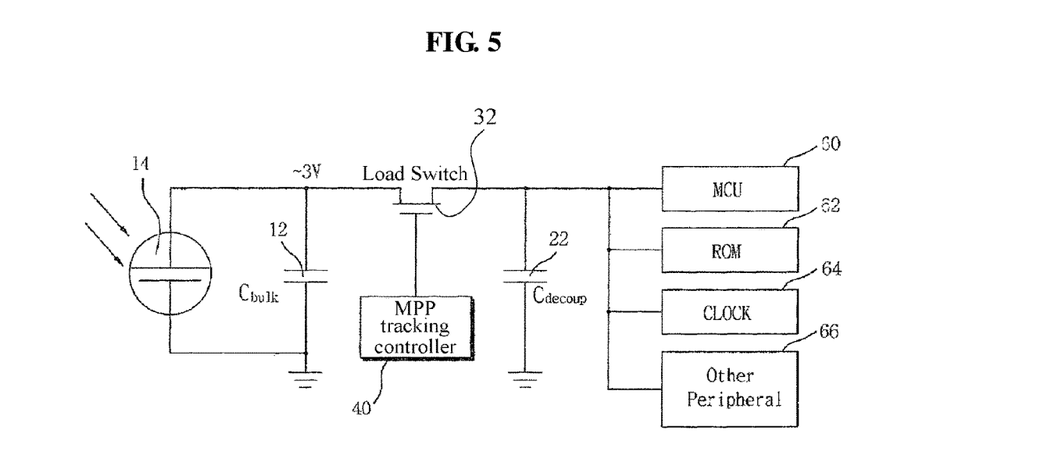
FIG. 5 illustrates an electronic device according to a first embodiment of the present invention.

The first embodiment of the electronic circuit has a structure in which the energy extractor 10 of the energy supply circuit 100 is a photovoltaic cell (PV cell), and the microprocessor 60 is included in the external electronic circuit 200. The external electronic circuit 200 may further include a ROM 62, a clock generator 64, and a peripheral device 66.

FIG. 5 illustrates an electronic device according to a first embodiment of the present invention. According to the first embodiment, the energy extractor 10 is a solar cell 14, the switch 30 is a field effect transistor 32, and the MPP controller 40 provides an on and off signal on which pulse width modulation (PWM) is performed for a gate of the field effect transistor 32 according to a voltage and a current (being subordination variables of an external environment, for example, a temperature and irradiance) of the solar cell 14. Thus, as the external environment is changed, MPP tracking control by dynamic power management (DPM) may be possible.

Detailed descriptions of an algorithm of providing dynamic power management in the energy supply circuit without the power converter, that is, a method of generating the on and off signal of the field effect transistor 32 will be provided.

Figure 6:
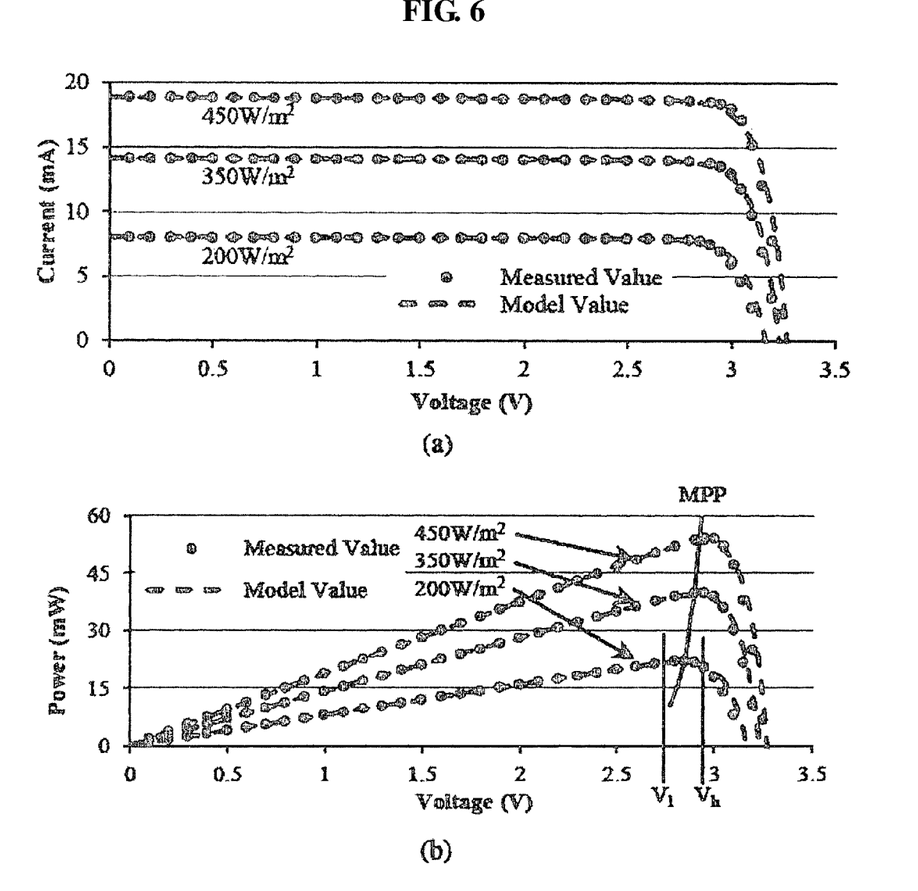
FIG. 6 illustrates a current-voltage curve and a power-voltage curve based on an irradiance at a temperature of 300K of a solar cell having a width of 4.5 cm and a height of 5.5 cm according to an embodiment of the present invention.

FIG. 6(a) illustrates a current-voltage curve (I-V curve) based on an irradiance at a temperature of 300K of a solar cell having a width of 4.5 cm and a height of 5.5 cm, and FIG. 6(b) illustrates a power-voltage curve (P-V curve). As illustrated in FIG. 6(a), a current is constantly maintained with respect to a voltage change by a predetermined voltage, for example, approximately 3V under a test condition of FIG. 6, regardless of the irradiance. Concisely, an MPP may be tracked when the current is continuously increased by the predetermined voltage due to a characteristic of the solar cell. Then the current is drastically decreased when a voltage exceeds the predetermined voltage. Thus, as illustrated in FIG. 6(b), the P-V curve has a shape of a slope. A change of the voltage of which the MPP is formed is not relatively great compared to a change of the irradiance. When a voltage at an MPP of a minimum irradiance being 200W/m² is Vl and a voltage at an MPP of a maximum irradiance being 450W/m² is Vh, MPP tracking may be performed in a voltage interval from Vl to Vh.

To generate an on and off signal for the MPP tracking in the MPP tracking controller 40, the voltage interval from Vl to Vh may be used. In a basic control policy, the field effect transistor 32 is turned on when an output end voltage of the solar cell 14 is greater than or equal to Vh, and the field effect transistor 32 is turned off when the output end voltage of the solar cell is less than or equal to Vl. The solar cell 14 continuously generates a power, regardless of an amount of the generated power, and the external electronic circuit 200 consumes the generated power. Accordingly, following processes are repeatedly performed.

① The field effect transistor 32 is turned on when the output end voltage of the solar cell 14 is greater than or equal to Vh, the output end voltage of the solar cell 14 may be decreased due to power consumption of the external electronic circuit 200.

② The field effect transistor 32 is turned off when the decreased output end voltage is less than or equal to Vl, and the output end voltage of the solar cell 14 may be increased since the solar cell 14 is isolated.

③ The field effect transistor 32 is turned on again when the increased output end voltage is greater than or equal to Vh, and the power consumption by the external electronic circuit 200 may occur.

Figure 7:
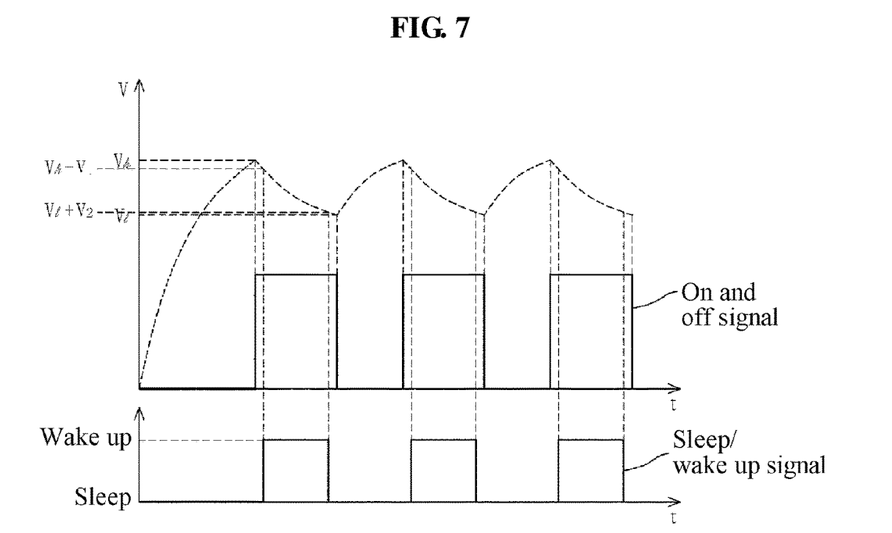
FIG. 7 illustrates a sleep/wake up signal and an on/off state of a switch.

When ① through ③ are iteratively performed, an on/off state of the field effect transistor 32 is as illustrated in FIG. 7, and FIG. 7 illustrates a waveform of the on and off signal generated in the MPP tracking controller 40. When the MPP tracking controller 40 generates a sleep/wake up signal, a state of the sleep/wake up signal is transitioned to a sleep state before the field effect transistor 32 is turned off, and the state of the sleep/wake up signal is transitioned to a wake up state after the field effect transistor 32 is turned on. Thus, as illustrated at the bottom of FIG. 7, the sleep/wake up signal may be transitioned to the sleep state→the wake up state at Vh−V1 directly after the output end voltage of the solar cell 14 is greater than or equal to Vh, and the sleep/wake up signal may be transitioned to the wake up state→the sleep state at Vl+V2 directly before the output end voltage of the solar cell 14 is less than or equal to Vl. Here, an additional operation of applying a wake up signal may be unnecessary based on a characteristic of the NVMPU 60 included in the external electronic circuit 200 (when a process is continued by automatically restoring a state in response to a power being applied). When the operation of applying the wake up signal is unnecessary, the sleep/wake up signal may be a type of sleep time indication, for example, a pulse at a sleep time.

In such waveform of the on and off signal, a duty may be changed due to temperature, irradiance, and a power consumption amount of an external electronic circuit. Detailed descriptions of a method of determining the duty of the on and off signal will be provided. As illustrated in FIG. 5, a bulk capacitor 12 is connected to the solar cell 14 in parallel, and a decoupling capacitor 22 is connected to the outputter 20 in parallel.

When a voltage between each end of the solar cell 14 is Vpv, a current flowing from the solar cell 14 is Ipv, and capacitance of the bulk capacitor 12 is Cbulk, Equation 1 may be obtained according to Kirchhoff's current law (KCL) since the solar cell 14 charges a bulk capacitor when the field effect transistor 32 is turned off.

$$I_{pv} = C_{bulk} \frac{dV_{pv}}{dt}, (t \text{ is time}) \quad [\text{Equation 1}]$$

As described above, the on and off signal may turn on the field effect transistor 32 at Vh and turn off the field effect transistor 32 at Vl, so that an amount of time for turning on the field effect transistor 32 in a steady state, for example, a time Toff when the field effect transistor 32 is off, is identical to an amount of time Tl,h to be used until the voltage between each end of the bulk capacitor 12 reaches Vh from Vl. Since Tl,h is obtained by performing integration on a voltage in Equation 1, Equation 2 may be obtained.

$$T_{l,h} = T_{off} = \int_{V_l}^{V_h} \frac{C_{bulk}}{I_{pv}} dV_{pv} \quad [\text{Equation 2}]$$

When the voltage between each end of the bulk capacitor 12 reaches Vh, the field effect transistor 32 is turned on. Here, the bulk capacitor 12 and the decoupling capacitor 22 are connected in parallel, thereby sharing a charge (since resistance of a conducting wire connecting a bulk capacitor and a decoupling capacitor is a greatly smaller value, there is no issue even when an amount of time for sharing the charge is 0 sec). A voltage Vmid between each end of a solar cell may be obtained as expressed in Equation 3 (Vth is a voltage between each end of a decoupling capacitor at a time when a switch is on, and Cdecoup is capacitance of the decoupling capacitor).

$$V_{mid} = \frac{C_{bulk}V_h + C_{decoup}V_{th}}{C_{bulk} + C_{decoup}} \quad [\text{Equation 3}]$$

In response to Toff, on being an amount of time to be used when the voltage between each end of the solar cell 14 reaches Vh after the charge is shared, Ttask being an amount of time for operating the external electronic circuit 200, and Ton, off being an amount of time to be used until the voltage between each end of the solar cell 14 is Vl, for example, a time for turning off the field effect transistor 32, Equation 4 is obtained based on the law of conservation of energy (Pon is an energy consumed by an external electronic circuit, and Psw is an energy consumed by performing switching by a switch).

$$V_{pv}I_{pv} = P_{on} + P_{sw} + (C_{bulk} + C_{decoup})V_{pv}\frac{dV_{pv}}{dt} \quad \text{[Equation 4]}$$

The amount of time Ton for turning off the field effect transistor 32 is identical to an amount of time Th,l to be used until the voltage between each end of the bulk capacitor 12 is decreased from Vh to Vl, and Equation 5 may be obtained from Equation 4.

$$T_{h,l} = T_{off,on} + T_{task} + T_{on,off} = \int_{V_{mid}}^{V_l} \frac{(C_{bulk} + C_{decoup})V_{pv}}{V_{pv}I_{pv} - P_{on} - P_{sw}} dV_{pv} \quad \text{[Equation 5]}$$

Concisely, an on state and an off state of the field effect transistor 32 iterate based on a cycle of (Tl,h+Th,l), and a duty cycle Ddpm may be changed according to an outside environment as shown in Equation 6.

$$D_{dpm} = \frac{T_{h,l}}{T_{l,h} + T_{h,l}} \quad \text{[Equation 6]}$$

Figure 8:
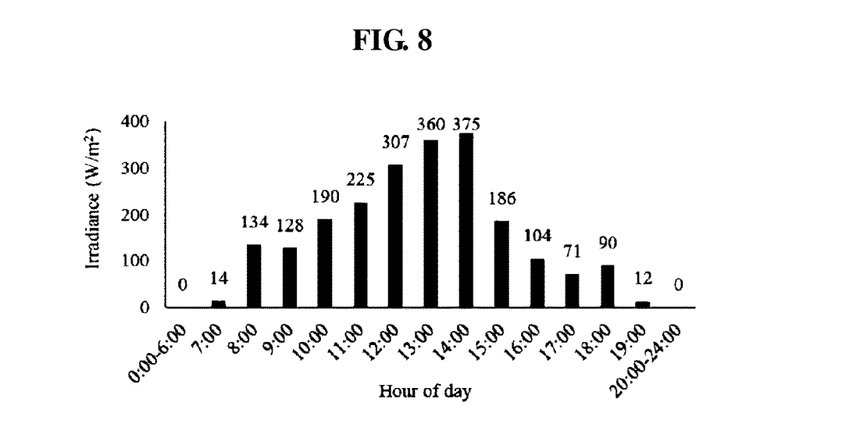
FIG. 8 is a graph illustrating an amount of sunshine by time provided from a national solar radiation database.
Figure 9:
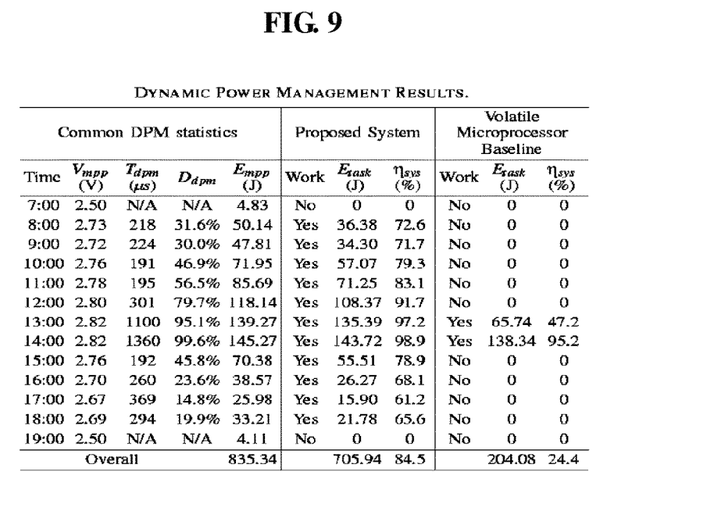
FIG. 9 is a test result table showing results for when an electronic device includes a solar battery having a width of 4.5 cm and a height of 5.5 cm and a nonvolatile microprocessor unit (NVMPU) according to an embodiment of the present invention.

FIG. 8 is a graph illustrating an amount of sunshine by time provided from a national solar radiation database, and FIG. 9 is a test result table showing results for when an electronic device includes a solar cell having a width of 4.5 cm and a height of 5.5 cm and a nonvolatile microprocessor unit (NVMPU) according to an embodiment of the present invention. An efficiency ηsys (=Pout/Pin, Pout is an output power, and Pin is an input power) may be relatively high (exceeding minimum 60%) at all times except at 7:00 and 19:00. Such efficiency may be higher when an external electronic circuit uses an NVMPU. This is because the NVMPU remembers an operating state, a program counter (PC), and data to consecutively perform an operation by restoring the remembered state when the switch 30 is turned on again in a case in which an operation does not terminate while the switch 30 is turned on once, and thus a relatively low interval of a duty cycle of the on and off signal is used.

A daily average efficiency of the electronic device is 84.5%. When the NVMPU is used (a comparative example), the daily average efficiency of the electronic device is greater than a daily average efficiency of 24.4%.

[Second Embodiment]

Figure 10:
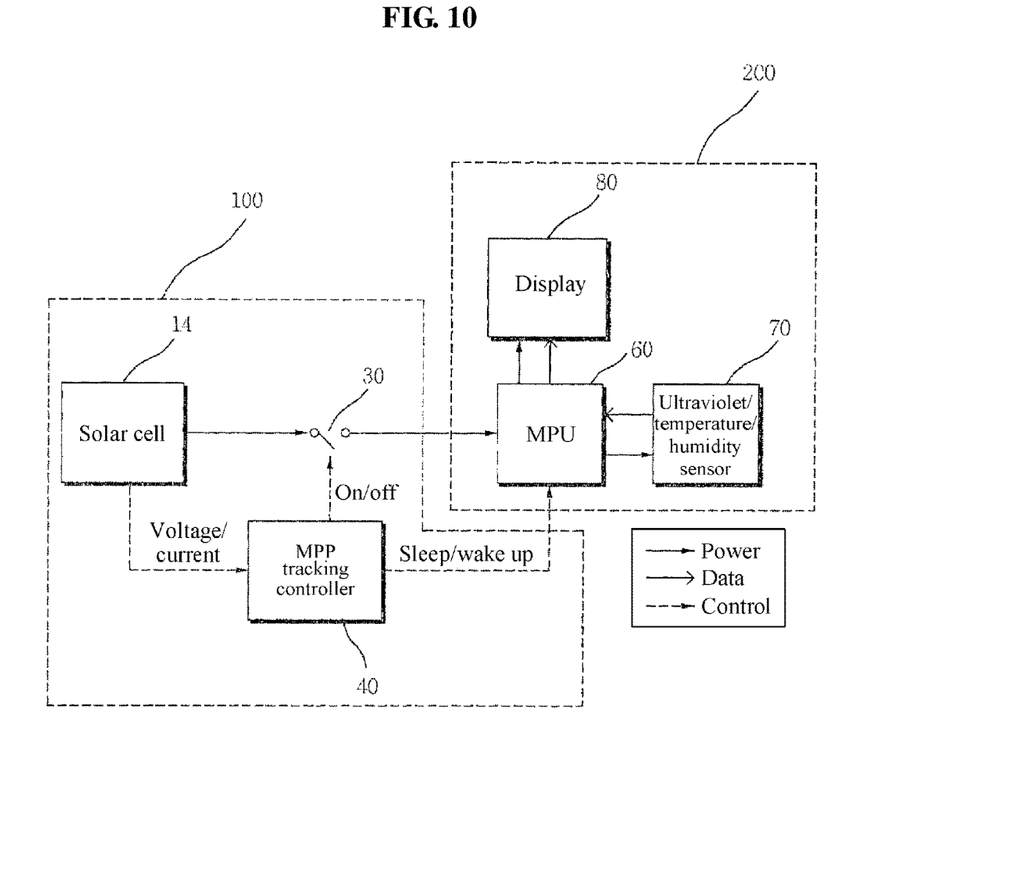
FIG. 10 illustrates an electronic device according to a second embodiment of the present invention.
Figure 11:
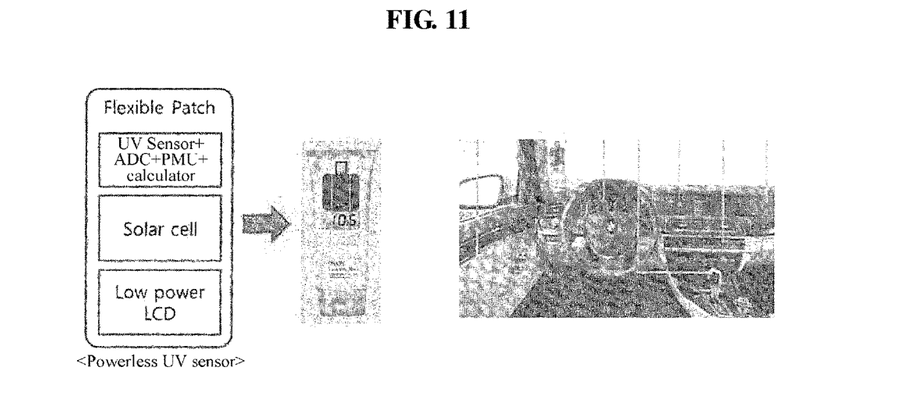
FIG. 11 illustrates a smart patch.

In a second embodiment of the present invention, the energy extractor 10 of the energy supply circuit 100 is the solar cell 14, and the external electronic circuit 200 is an ultraviolet index displaying circuit.

FIG. 10 illustrates an electronic device according to a second embodiment of the present invention. The energy supply circuit 100 is identical to that of the first embodiment, and the external electronic circuit 200 includes an ultraviolet sensor 70, a microprocessor 60, for example, a microprocessor unit (MPU), and a display 80. Based on a type of the ultraviolet sensor 70, an AD converter may be disposed between the ultraviolet sensor 70 and the microprocessor 60. It is advisable to provide the display 80 as a low power liquid crystal display (LCD). The electronic device illustrated in FIG. 9 may be produced as a slim electronic device at low cost, such that the electronic device may be provided as a patch attached to an inside of a vehicle or a sunscreen container. The patch refers to a smart patch which is adaptively used according to an environment.

The ultraviolet index displaying device illustrated in FIG. 10 is required to apply a sleep signal to an ultraviolet index displaying circuit corresponding to the external electronic circuit 200 in the energy supply circuit 100. Ultraviolet rays may be sensed based on a unit of measurement, an accumulated dose, and an accumulated amount of ultraviolet rays accumulated over a predetermined amount of time, for example, 10 minutes, may be calculated, such that an operation may be continued by restoring a remembered state in the external electronic circuit 200, that is, the ultraviolet index displaying circuit. Concisely, an electronic device, for example, the ultraviolet index displaying device illustrated in FIG. 10, required to remember a state, may apply a sleep signal to the external electronic circuit 200 to remember a state before the switch 30 is turned off.

[Third Embodiment]

Figure 12:
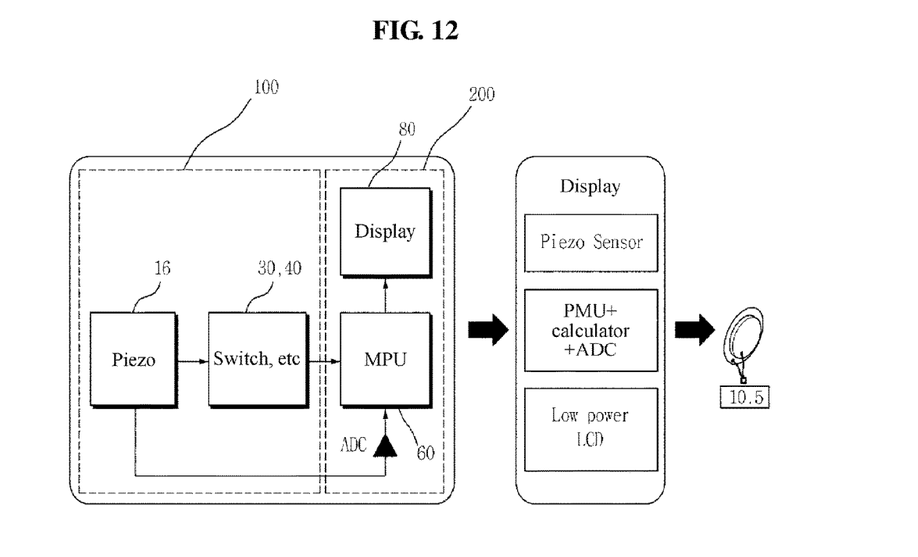
FIG. 12 illustrates an electronic device according to a third embodiment of the present invention.

In a third embodiment of the present invention, the energy extractor 10 of the energy supply circuit 100 is a piezoelectric element 16, and the external electronic circuit 200 is a weight measurement circuit.

FIG. 12 illustrates an electronic device according to a third embodiment of the present invention. In the energy supply circuit 100, the energy extractor 10 is replaced with the piezoelectric element 16 from the solar cell 14, and the external electronic circuit 200 includes the microprocessor 60 and the display 80. In the third embodiment, the piezoelectric element 16 may supply energy to the energy extractor 10 and provide pressure information or weight information to the microprocessor 60 at the same time.

In the second embodiment and the third embodiment, the external electronic circuit 200 may process information, for example, an ultraviolet index and a weight, on an object to be supplied the energy, thereby increasing efficiency of the electronic device. In a relatively dark place in which ultraviolet index measurement is not required, the energy supply circuit 100 may not need to supply sufficient energy to the external electronic circuit 200. Thus, when the weight is not measured, the energy may not be produced in the piezoelectric element 16 of the energy supply circuit 100.

According to an embodiment of the present invention, an electronic circuit and an energy supply circuit without a power converter or a bulk energy storage device may have a simple structure and low manufacturing costs, and may have no energy loss due to power conversion and no reduction in life due to charging and discharging of an energy storage device.

According to an embodiment of the present invention, it is possible to increase energy efficiency since a maximum power point (MPP) is tracked and controlled according to a change in an outside environment.

The invention claimed is:
1. An energy supply circuit, comprising:
an energy source configured to generate a power;
an outputter configured to supply the power to an electronic circuit;
a switch configured to control connection between the energy source and the outputter; and
a controller configured to:
generate a turn on signal for turning on the switch when a voltage of the energy source is higher than Vh which corresponds to a maximum power point (MPP) of a maximum irradiance, generate a turn off signal for turning off the switch when the voltage of the energy source is lower than Vl which corresponds to a MPP of a minimum irradiance, and generate a sleep signal or a wake up signal that controls a power mode of the electronic circuit, and wherein the Vh is sufficiently close to the Vl for supplying the constant voltage to drive the electronic circuit.

2. The energy supply circuit of claim 1, wherein the energy source comprises photoelectric element.

3. The energy supply circuit of claim 1, wherein the controller is configured to generate the wake up signal after generating the turn on signal, and generate the sleep signal before generating the turn off signal.

4. The energy supply circuit of claim 1, further comprising a bulk capacitor connected to each end of the energy source in parallel and a decoupling capacitor connected to each end of the outputter in parallel.

5. The electronic device of claim 4, wherein a duty cycle Ddpm of the on signal is expressed as equations below, Vpv being an output of the energy source, Ipv being an output current of the energy source, Cbulk being a capacitance of the bulk capacitor, Cdecoup being a capacitance of the decoupling capacitor, Vmid being an output voltage of the energy source at a time at which charge sharing between the bulk capacitor and the decoupling capacitor occurs when the switch is turned-on, Pon being an energy consumed by the electronic circuit, and Psw being an energy consumed when the switch is switched $$D_{dpm} = \frac{T_{h,l}}{T_{l,h} + T_{h,l}}$$

$$T_{h,l} = T_{off,on} + T_{task} + T_{on,off} = \int_{V_{mid}}^{V_l} \frac{(C_{bulk} + C_{decoup})V_{pv}}{V_{pv}I_{pv} - P_{on} - P_{sw}} dV_{pv}.$$

6. An electronic device, comprising:
an energy supply circuit; and
an electronic circuit supplied a power from the energy supply circuit,
wherein the energy supply circuit comprises an energy source configured to generate the power, an outputter configured to supply the power to the electronic circuit, a switch configured to control connection between the energy source and the outputter and a controller configured to generate a turn on signal for turning on the switch when a voltage of the energy source is higher than Vh which corresponds to a maximum power point (MPP) of a maximum irradiance, generate a turn off signal for turning off the switch when the voltage of the energy source is lower than Vl which corresponds to a MPP of a minimum irradiance, and generate a sleep signal or a wake up signal that controls a power mode of the electronic circuit, and wherein the Vh is sufficiently close to the Vl for supplying the constant voltage to drive the electronic circuit.

7. The electronic device of claim 6, wherein the electronic circuit comprises a non-volatile microprocessor.

8. The electronic device of claim 6, wherein the electronic circuit comprises an ultraviolet sensor configured to sense ultraviolet light, a processor configured to accumulate ultraviolet light amounts based on an output of the ultraviolet sensor, remember a state of a current operation when the sleep signal is received, and restore the remembered state when the wake up signal is received, and a display configured to display an ultraviolet index based on the accumulated ultraviolet light amounts.

9. The electronic device of claim 6, wherein the electronic circuit comprises an ultraviolet sensor configured to sense ultraviolet light, and a display configured to display an ultraviolet index based on an output of the ultraviolet sensor.

10. The electronic device of claim 8, further comprising a patch configured to allow the electronic device to be attached to an object.

* * * * *